United States Patent [19]
Gale et al.

[11] Patent Number: 4,796,188
[45] Date of Patent: Jan. 3, 1989

[54] PHASE ROTATION OF SIGNALS

[75] Inventors: Simon J. Gale, Bishop's Stortford; Graham R. Fearnhead, Chelmsford; Mark L. C. Furnace, Harlow, all of Great Britain

[73] Assignee: STC PLC, London, England

[21] Appl. No.: 915,394

[22] Filed: Oct. 6, 1986

[30] Foreign Application Priority Data

Oct. 18, 1985 [GB] United Kingdom ............. 8525702

[51] Int. Cl.⁴ .................. H04L 7/02; G06F 12/06
[52] U.S. Cl. .................. 364/443; 340/870.34; 375/111; 375/118
[58] Field of Search ......... 364/443, 726, 727, 200, 364/900; 342/352, 355, 367, 418, 420; 375/97, 115, 111, 118, 79; 340/870.34

[56] References Cited

U.S. PATENT DOCUMENTS

| | | | |
|---|---|---|---|
| 3,767,905 | 10/1973 | Garde | 364/726 |
| 3,927,312 | 12/1975 | Dickinson | 364/726 |
| 4,231,102 | 10/1980 | Barr et al. | 364/726 |
| 4,298,959 | 11/1981 | Sundermeyer et al. | 364/900 |
| 4,485,383 | 11/1984 | Maher | 375/114 X |
| 4,527,278 | 7/1985 | Deconche et al. | 375/97 |
| 4,530,103 | 7/1985 | Mosley, Jr. et al. | 375/1 |
| 4,598,289 | 7/1986 | Marin et al. | 340/870.34 |
| 4,601,005 | 7/1986 | Kilvington | 364/602 |
| 4,613,977 | 4/1986 | Wong et al. | 375/97 |
| 4,667,308 | 5/1987 | Hayes et al. | 364/900 |

Primary Examiner—Parshotam S. Lall
Assistant Examiner—Thomas G. Black
Attorney, Agent, or Firm—Lee & Smith

[57] ABSTRACT

Phase rotation of an input digital signal is effected by applying the input signal to a look-up table in a memory together with a rotation control signal. The output of the memory is the phase rotated signal. To reduce the size of the PROM required for the look-up table advantage is taken of the symmetry of the quadrants through which the signal may be rotated. With a maximum 0° to 360° phase rotation range divided into four 90° quadrants a look-up table is only required for one quadrant. Thus the quadrant which the input signal is in is determined and the input signal transformed to correspond to the one quadrant by simple logic external to the PROM.

6 Claims, 2 Drawing Sheets

PHASE ROTATION OF SIGNALS

BACKGROUND OF THE INVENTION

This invention relates to a method and means for effecting phase rotation of signals and is especially useful in electronic navigation systems.

A recent development in navigation is a system known as NAVSTAR, utilising a number of earth satellites.

The complete Navstar system is planned to consist of 18 satellites arranged in nearly circular orbits with a radii of 26,600 Km, and an inclination to the earth's equatorial plane 55°. Each satellite transmits two navigation signals, designated L1 and L2 and centred on 1575 and 1228 MHz respectively.

Both signals convey ranging information by means of modulations which are locked in time to atomic standards. The forms of these modulations (which are known as pseudorandom codes because they appear random but are nevertheless well defined) are unique to each satellite.

By measuring the phases of the received codes against a clock in the receiver, together with the Doppler shifts of the radio frequency carriers, a user can calculate the range and range rate to a particular satellite by monitoring four satellites. By decoding data about their motions which are also modulated onto the transmitted signals, the user may solve equations to determine his three-dimensional position and velocity and also apply corrections to his clock, making it conform to satellite time.

Two pseudorandom codes are in fact transmitted by each satellite. The first of these is used to aid acquisition of the satellite signals and to provide coarse navigation, and hence is called the Coarse/Acquisition (C/A) code. The second has a 10-times higher modulation rate which yields the full navigational accuracy of the system, and is designated the Precision (P) code.

A basic Navstar receiver typically contains a low-noise amplifier and down-converter to a convenient IF, followed by one or more code and carrier tracking channels, each capable of tracking the transmissions from any satellite. There are also associated range and range-rate measurement circuits.

The purpose of the code tracking loop is to keep a code generator in the receiver in step with a received pseudorandom sequence, and hence provide information on the range to the satellite being tracked.

One implementation of a Navstar receiver includes amplification of the received r.f. signals and down conversion to i.f. frequencies to produce quadrature signals; analogue-to-digital converters to digitise separately the quadrature signals; local digital code generating means; means for correlating the digitised quadrature signals separately with the same locally generated digital codes; channel processing means to which the outputs of the correlation means are applied, the processing means being arranged to control the code and carrier tracking of the receiver; and correction means responsive to control signals generated in the processing means to effect phase rotation of the baseband signal phasor represented by the quadrature signals to effect Doppler tracking in the receiver loop. Any Doppler shift will cause the phasor to rotate and by removing this rotation the Doppler shift can be tracked. To remove the phase rotation from a signal vector the latter must be multiplied by a counter-rotating unit vector.

Attention is directed to our U.S. application Ser. No. 706,310, now U.S. Pat. No. 4,651,154 filed Feb. 27, 1985, which discusses this aspect in greater detail. The above referred to receiver implementation further includes a digital data memory means loaded with data in the form of "look-up" tables incorporating combinations of signal input combinations, means for applying the digitised quadrature signals as partial address signals for the memory means, and means for generating additional address signals for the memory means in response to control signals whereby phase rotation correction is effected by accessing the memory means in accordance with the address signals to produce an output signal for the channel signal processing means.

In our U.S. application Ser. No. 842119 filed May 20, 1986 there is described a method and apparatus for effecting phase rotation which involves a transformation on the digitised I and Q vectors in order to overcome accuracy problems arising because of the compressions and truncation involved in rotating a uniformally arranged square grid of points within a square grid of requantisation boundaries. This can be implemented by incorporating a modification in the phase rotation look-up table. In particular this second Application provides a method of effecting phase rotation of a digital signal by applying said digital signal as partial address signals for a look-up table in a memory together with rotation control signals forming additional address signals whereby the memory output represents the phase rotated signal, each input vector being modified so that points representing digitised input vector values plotted on a rectangular co-ordinate grid are transformed to lie on an alternative co-ordinate system, in particular a circular system, the rotated vector magnitudes being retransformed and requantised to a digital output.

Difficulties have arisen when putting the above referred to phase rotator into practice in certain cases owing to size of the PROM required for the look-up table. The present invention thus seeks to reduce the size of the PROM required for the look-up table.

SUMMARY OF THE PRESENT INVENTION

According to one aspect of the present invention there is provided a method of effecting phase rotation of an input digital signal by applying said input as partial address signals for a look-up table in a memory together with rotation control signals forming additional address signals, the phase rotated signal being obtained from the output of the memory, wherein the phase is to be rotated in a range up to 360°, which range is divided into four 90° quadrants and wherein the look-up table is provided for only one said quadrant, and including the steps of determining which quadrant the input signal is in and transforming the input signal if necessary to provide a suitable partial address signal for the look-up table.

According to another aspect of the present invention there is provided apparatus for effecting phase rotation of an input digital signal including a memory containing a look-up table, means for applying said digital signal as a partial address for the memory, means for applying additional address signals representing the required phase rotation angle to the memory, whereby the combination of partial and additional address signals results in selection and reading out of part of the look-up table, the read out from the look-up table representing the phase rotated signal values, wherein the phase is to be rotated in a range up to 360°, which range is divided into four 90° quadrants and wherein the look-up table is provided for only one said quadrant, and including means for determining which quadrant the input signal is in and means for transforming the input signal if necessary to provide a suitable partial address signal for the look-up table.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
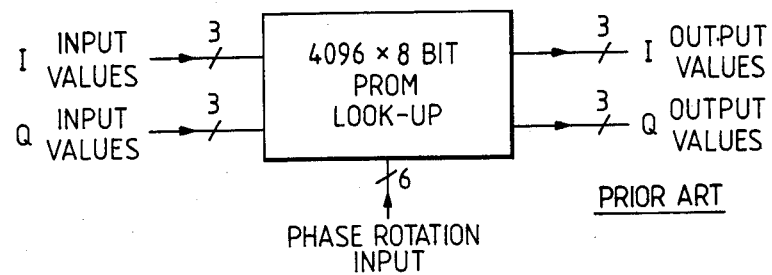
FIG. 1 illustrates highly schematically a known phase rotator.
Figure 2:
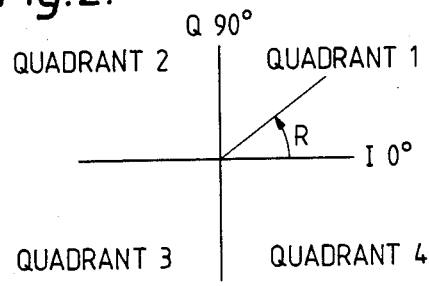
FIG. 2 illustrates phase rotation and the four quadrants in which it can take place.

The phase rotator described in the aforementioned Applications for the digital Navstar receiver is used to close the carrier loop providing phase corrections to the digitised I and Q samples from the zero IF. One proposed configuration uses, say, 3 bits each of I and Q samples with 6 bits of phase rotation, giving 3 bits of I and Q as output. This leads to implementation as a 4K×8 bit PROM look-up table as illustrated in FIG. 1. The input vector description of I and Q is rotated by a rotation angle R (FIG. 2). All possible I and Q vector combinations are coded into 3 bits of I and 3 bits of Q. The rotation vector is a 6 bit quantisation of the complete rotation required (360°), giving a 5.265° quantisation (5.265° is assumed to be the minimum phase angle). For a given I and Q input vector and a given rotation angle, there is a unique output answer which is the rotated solution. The phase rotation input of FIG. 1 is a rotation word from a numerically controlled oscillator (NCO). A channel processor (not shown) calculates the rotation frequency to be applied to correct the Doppler loss in the received signal. This rotation frequency is fed to the NCO which derives the phase rotation angle R which is described by the rotation word and required to effect the necessary phase rotation of the signal vector.

Whereas such an arrangement is not wholly impracticable for 3 bits of I and Q values, it is impracticable for 4 bits of I and Q values. In any event reduction in size of the PROM would be desirable even for 3 bits of I and Q values.

The present invention is based on the realisation that there is symmetry of the rotation operation and that this can be taken advantage of to reduce the size of the look-up table. In particular the look-up table size may be reduced by examining the rotation operation and eliminating the duplication of quadrant information in the table by suitable combinations logic, this reduces the phase look-up to a single quadrant. Thus the look-up of one quadrant is performed by the PROM and this is then transferred for the other quadrants by external logic.

The quadrant which the input vector is in is determined by looking at the sign bits of the I and Q components after removing them from the I and Q sub-quadrant information. For 3 bits of I and Q values there are 2 bits of I and Q magnitude and 1 bit of sign. Referring to FIG. 2 the quadrants are labelled 1, 2, 3 and 4. The sign bits are decoded into input quadrant information which is used to determine if the remaining I and Q inputs should be swapped in order to reference the angle to 0° before application to the PROM, as indicated below.

Figure 3:
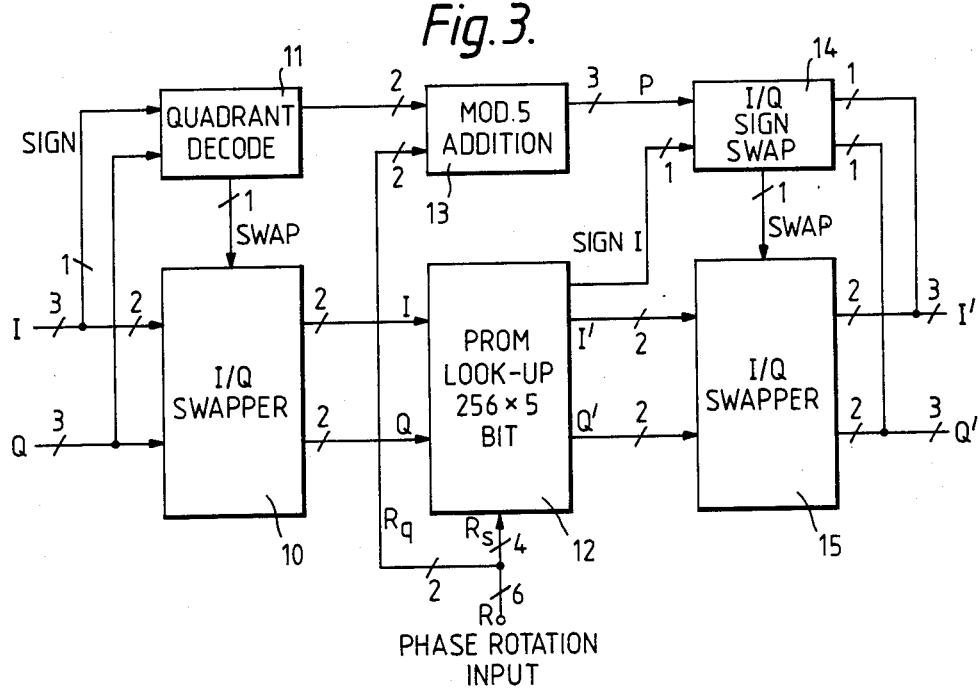
FIG. 3 illustrates a block diagram of one embodiment of phase rotator according to the present invention.

If quadrant=1 (i.e. I and Q+ve) then do nothing
If quadrant=2 (i.e. I−ve, Q+ve) then swap I,Q
If quadrant=3 (i.e. I−ve, Q−ve) then do nothing
If quadrant=4 (i.e. I+ve, Q−ve) then swap I,Q The block circuit diagram of FIG. 3 is of a first embodiment of phase rotator according to the present invention and for 3 bits of I and Q values. The circuit includes an I/Q swapper 10, a sign (quadrant) decoder 11, a look-up PROM 12, a modulo 5 adder 13, an output quadrant decoder (I/Q sign swap) 14, and another I/Q swapper 15.

The phase rotation input (rotation word) R is of 6 bits which is split into 4 bits of sub-quadrant angle information $R_s$ that is applied to the look-up PROM 12 and 2 bits of (rotation) quadrant information $R_q$ that is applied to the modulo 5 adder 13. The I and Q inputs of 3 bits are split into 2 bits of magnitude which are applied to the I,Q swapper 10 and 1 bit of sign which are applied to the sign decoder 11 which determines which quadrant 1, 2, 3 or 4 the input values are in (input quadrant information) and whether or not I and Q need to be swapped in accordance therewith. If swapping is necessary this is attended to by the I,Q swapper 10. The input quadrant information as determined by the sign modulo 11 is applied as 2 bits to the module 5 adder 13 together with the 2 bits of quadrant information from the rotation input. The result of quadrant addition in the modulo 5 adder 13 is P which equals 1, 2, 3 or 4 and is applied as 3 bits to the quadrant decoder 14 which is required to determine if a further I Q sign swap is necessary following phase rotation by the PROM. This is necessary if the result of the addition of the two vectors together goes into the next quadrant. The look-up PROM is loaded with look-up tables whereby the input I,Q and $R_s$ are used to address locations in the PROM and the PROM gives outputs sign I, I' and Q'. I' and Q' representing the phase rotated channel signals. If sign swap of I' and Q' is necessary this is attended to by IQ swapper 15. The quadrant decoder 14 has outputs concerning the signs of I' and Q' which are combined with the outputs of the IQ swapper 15 to give 3 bit values of I' and Q'. The quadrant addition results in a sign change in I' and Q' corresponding to the quadrant and/or a swap of I' and Q' given by the following.

For P = 1, (I,Q) $\begin{pmatrix} \cos\phi & \sin\phi \\ \sin\phi & \cos\phi \end{pmatrix}$ = (I,Q) $\begin{pmatrix} 1 & 0 \\ 0 & 1 \end{pmatrix}$ = I',Q'
(i.e. first quadrant)

For P = 2, (I,Q) $\begin{pmatrix} \cos\phi & \sin\phi \\ \sin\phi & \cos\phi \end{pmatrix}$ = (I,Q) $\begin{pmatrix} 0 & 1 \\ -1 & 0 \end{pmatrix}$ = I',Q'
(second quadrant)

-continued

For P = 3, (I,Q) (third quadrant)
$$(I,Q) \begin{pmatrix} \cos\phi & \sin\phi \\ \sin\phi & \cos\phi \end{pmatrix} = (I,Q) \begin{pmatrix} -1 & 0 \\ 0 & -1 \end{pmatrix} = I',Q'$$

For P = 4, (I,Q) (fourth quadrant)
$$(I,Q) \begin{pmatrix} \cos\phi & \sin\phi \\ \sin\phi & \cos\phi \end{pmatrix} = (I,Q) \begin{pmatrix} 0 & -1 \\ 1 & 0 \end{pmatrix} = I',Q'$$

where $\phi = (P-1)\pi/2$ where the basic algorithm used for phase rotation is $$I' = I \cos\phi - Q \sin\phi$$

$$Q' = Q \cos\phi + I \sin\phi$$

By reducing the phase look-up to a single quadrant in the example described above the PROM size is reduced from 4096×8 bit to 256×5 bit.

Figure 4:
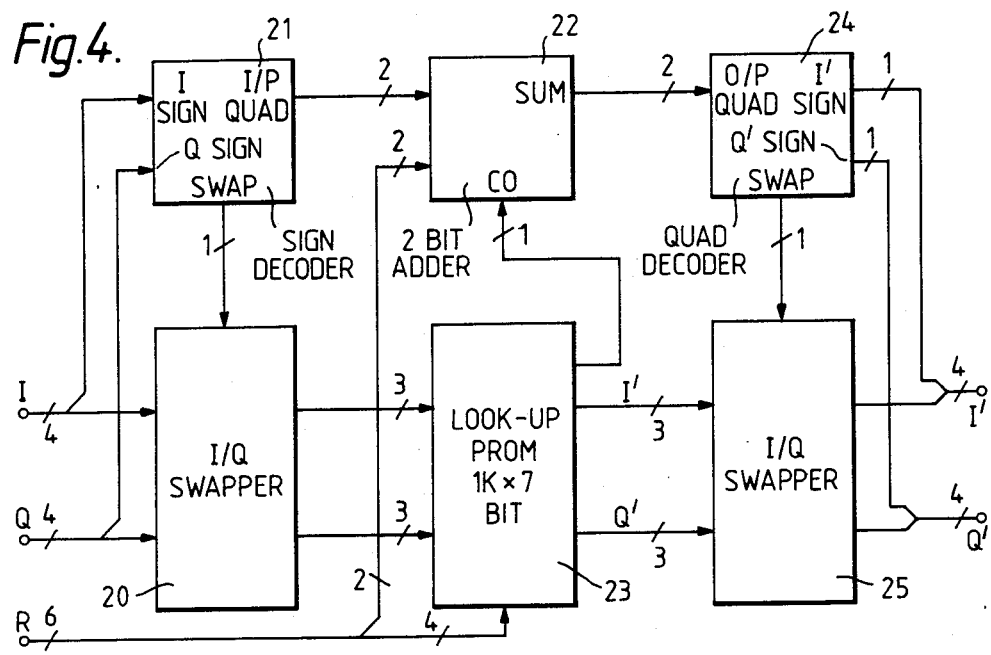
FIG. 4 illustrates a block diagram of another embodiment of phase rotator according to the present invention.

FIG. 4 illustrates an alternative embodiment of phase rotator of the present invention and which is illustrated for 4 bit I and Q values. The circuit includes an I/Q swapper 20, a sign decoder 21, a 2 bit adder 22, a look-up PROM 23, a quadrant decoder 24 and a further I,Q swapper 25.

Figure 5:
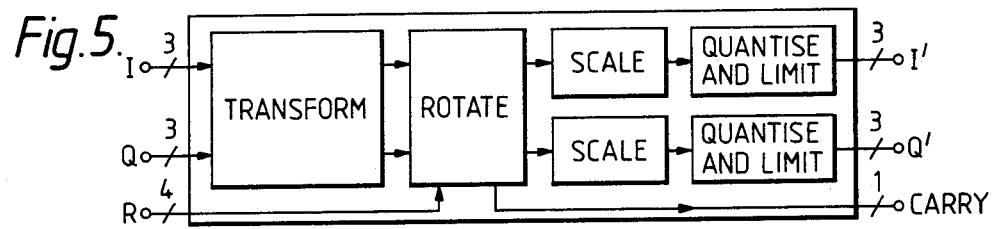
FIG. 5 illustrates in block form the functions of the PROM of FIG. 4.
Figure 6:
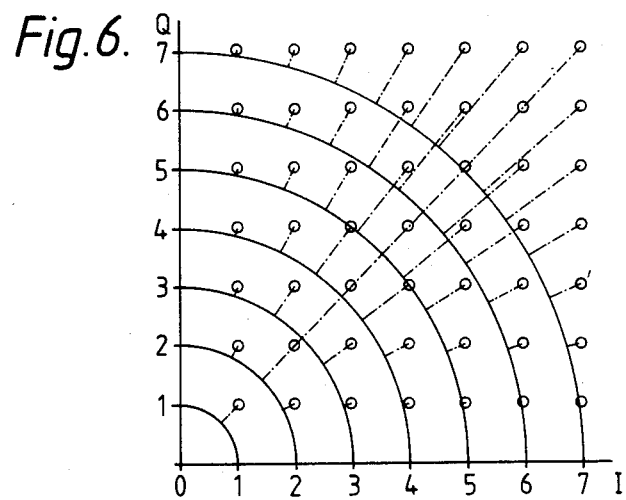
FIG. 6 illustrates I/Q transformation.

The 4 bit I and Q inputs are divided into 3 bit magnitude and 1 bit sign. As before the signs are decoded in decoder 21 into input quadrant information which is used to determine if the remaining I and Q inputs should be swapped in swapper 20 in order to reference the angle to 0°. The input quadrant information is applied to the 2 bit adder 22 together with the 2 bits of rotation quadrant information from the rotation input R. The I-Q vector is rotated by the subquadrant angle, comprising the remaining 4 bits from the rotation input R (6 bit rotation angle) in the PROM 23 which gives 3 bits each of I' and Q' output and a carry bit which is applied to the 2 bit adder 22. The function of the PROM 23 is indicated schematically in FIG. 5. In the "transform" block the phase of each input vector is maintained but its magnitude is scaled to lie on a circle whose radius equals the maximum amplitude of I or Q. This is illustrated in FIG. 6. The I/Q points, those indicated by a small circle, are transformed in the points indicated by a dot on the quarter circle curves. Thus the I and Q inputs are mapped onto a circular pattern. The transformed inputs are then rotated (phase rotation) in the "rotate" block in accordance with the formula $$I' = I \cos R - Q \sin R$$

$$Q' = Q \cos R + I \sin R$$

where R is the subquadrant angle. The output coordinates I',Q' are then scaled, for example by a factor of 1.05, and quantised. If the result is greater than 90° then the "carry flag" is set (CO input of adder 22) and the output=result−90°. The sum of the input, rotation and carry quadrants as obtained by adder 22 is then decoded in decoder 24 into I' and Q' signs and put back on the outputs. If the quadrant sum gives quadrant 2 or 4 (FIG. 2) then the I' and Q' magnitudes are swapped in swapper 25. Both the input and output quadrant decoder sections 21 and 24 can be implemented using a few gates. The required size of the PROM 23 is of the order 1K×7 bit rather than 16K by 7 bits, in order to satisfy access times, however, the look-up table may be comprised by two 512×8 bit PROMS.

By taking advantage of the symmetry of the rotation operation the size of the look-up table may thus be substantially reduced to approximately 4% of the previously required size. Whilst extra logic functions are required these are only simple logic functions.

We claim:

1. A method of rotating the phase of an input digital signal having in-phase and quadrature components, which phase is to be rotated in a range up to 360°, which range is divided into four 90° quadrants, the method involving the use of a look-up table in a memory, the memory having a memory output and the look-up table being provided for only one said quadrant, the method including the steps of determining which quadrant the input signal is in by consideration of the signs of the input components and transforming the input signal if necessary to correspond to the one said quadrant, applying said input as a partial address signal for said look-up table, and applying a rotation control signal forming an additional address signal to said look-up table, the memory output representing the input signal with its phase rotated.

2. A method as claimed in claim 1, wherein if the input signal is in the first or third quadrant relative to 0° the input signal is unaffected and wherein if the input signal is in the second or fourth quadrants the inphase and quadrature components are swapped.

3. A method as claimed in claim 2 wherein the output from the look-up table is applied to an inphase and quadrature component swapper which is operated if the phase rotation by the look-up table served to locate the phase rotated signal in the next quadrant.

4. Apparatus for rotating the phase of an input digital signal having in-phase and quadrature components, which phase is to be rotated in a range of up to 360°, which range is divided into four 90° quadrants, the apparatus including a memory including a look-up table for only one said quadrant, means for determining which quadrant the input signal is in by consideration of the signs of the input components and if necessary transforming the input signal to correspond to the one said quadrant, means for applying said digital signal as a partial address for the memory, and means for applying an additional address signal representing the required phase rotation angle to the memory, and wherein the combination of partial and address signals results in selection and reading out of part of the look-up table, the read out from the look-up table representing the phase rotated signal value.

5. Apparatus as claimed in claim 4 and including means whereby if the input signal is in the second or fourth quadrant relative to 0° the inphase and quadrature components are swapped before application to the look-up table.

6. Apparatus as claimed in claim 5 and including means whereby if the phase rotation by the look-up table serves to locate the phase rotated signal in the next quadrant the inphase and quadrature components of the phase rotated signal are swapped.

* * * * *